US005802105A

United States Patent [19]
Tiedemann, Jr. et al.

[11] Patent Number: 5,802,105
[45] Date of Patent: Sep. 1, 1998

[54] METHOD AND APPARATUS FOR TESTING A DIGITAL COMMUNICATION CHANNEL

[75] Inventors: Edward G. Tiedemann, Jr.; Yu-Cheun Jou, both of San Diego, Calif.; Lindsay A. Weaver, Jr., Boulder, Colo.; Gwain Bayley, San Diego, Calif.

[73] Assignee: Qualcomm Incorporated, San Diego, Calif.

[21] Appl. No.: 347,526

[22] Filed: Nov. 30, 1994

[51] Int. Cl.⁶ ............................. H04B 3/46; H04B 17/00
[52] U.S. Cl. .................. 375/225; 375/226; 375/227; 370/242; 370/252; 371/20.4; 371/67.1
[58] Field of Search ........................... 375/225, 224, 375/377, 205, 206, 227, 226; 370/84, 105.1, 13, 241, 242, 252; 371/3, 20.1, 20.4, 67.1, 71; 455/67.4

[56] References Cited

U.S. PATENT DOCUMENTS

| | | | |
|---|---|---|---|
| 4,663,766 | 5/1987 | Bremer | 375/225 |
| 5,054,035 | 10/1991 | Tarallo et al. | 375/225 |
| 5,157,651 | 10/1992 | Ghelberg et al. | 375/225 |

*Primary Examiner*—Don N. Vo
*Attorney, Agent, or Firm*—Russell B. Miller; Sean English

[57] ABSTRACT

A system and method for testing signal transmission quality within a digital communication system is disclosed herein. The system may be incorporated within a digital cellular communication system in which information is exchanged over spread spectrum communication channels, among a plurality of mobile users, via at least one cell-site. The system contemplates testing a digital communication channel by transmitting a test sequence of digital data over the communication channel. The test sequence of digital data transmitted over the communication channel is received at a receiving station, within which is also generated a replica of the test sequence of digital data. The accuracy of transmission over the communication channel is then determined by comparing the replica of the test sequence of digital data to the test sequence of data received over the communication channel. The system allows the test sequence of digital data to be transmitted at one of a set of known data rates, with the receive station being disposed to identify the data rate associated with each test sequence of digital data. In a preferred implementation transmission of the test sequence involves generating a first plurality of data packets, which collectively comprise the test sequence of digital data. Each data packet is assigned one of a multiplicity of data rates in accordance with a first pseudorandom process, and is then transmitted at the data rate assigned thereto.

28 Claims, 3 Drawing Sheets

METHOD AND APPARATUS FOR TESTING A DIGITAL COMMUNICATION CHANNEL

BACKGROUND OF THE INVENTION

I. Field of the Invention

The present invention relates to communication systems utilizing digital signals, and, more particularly, to a novel and improved method and apparatus for evaluating the quality of transmission over digital communication channels.

II. Description of the Related Art

Communication systems have been developed to allow transmission of information signals from a source location to a physically distinct user destination. Both analog and digital methods have been used to transmit such information signals over communication channels linking the source and user locations. Digital methods tend to afford several advantages relative to analog techniques, including, for example, improved immunity to channel noise and interference, increased capacity, and improved security of communication through the use of encryption.

In transmitting an information signal from a source location over a communication channel, the information signal is first converted into a form suitable for efficient transmission over the channel. Conversion, or modulation, of the information signal involves varying a parameter of a carrier wave on the basis of the information signal in such a way that the spectrum of the resulting modulated carrier is confined within the channel bandwidth. At the user location the original message signal is replicated from a version of the modulated carrier received subsequent to propagation over the channel. Such replication is generally achieved by using an inverse of the modulation process employed by the source transmitter.

Modulation also facilitates multiple-access, i.e., the simultaneous transmission of several signals over a common channel. Multiple-access communication systems will often include a plurality of remote subscriber units requiring intermittent service of relatively short duration rather than continuous access to the communication channel. Systems designed to enable communication over brief periods of time with a set of subscriber units have been termed multiple access communication systems.

A particular type of multiple access communication system is known as a spread spectrum system. In spread spectrum systems, the modulation technique utilized results in a spreading of the transmitted signal over a wide frequency band within the communication channel. One type of multiple access spread spectrum system is a code division multiple access (CDMA) modulation system. Other multiple access communication system techniques, such as time division multiple access (TDMA), frequency division multiple access (FDMA) and AM modulation schemes such as amplitude companded single sideband are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, the disclosure of which is incorporated by reference herein.

In the above-referenced U.S. Pat. No. 4,901,307, a multiple access technique is disclosed where a large number of mobile telephone system users each having a transceiver communicate through satellite repeaters or terrestrial base stations using CDMA spread spectrum communication signals. In using CDMA communications, the frequency spectrum can be reused multiple times thus permitting an increase in system user capacity. The use of CDMA results in a much higher spectral efficiency than can be achieved using other multiple access techniques. A further example of a CDMA communication system is disclosed in U.S. Pat. No. 5,103,459, entitled "SYSTEM AND METHOD FOR GENERATING SIGNAL WAVEFORMS IN A CDMA CELLULAR TELEPHONE SYSTEM", also assigned to the assignee of the present invention, the disclosure of which is incorporated by reference herein.

More particularly, communication in a CDMA system between a pair of locations is achieved by spreading each transmitted signal over the channel bandwidth by using a unique user spreading code. Specific transmitted signals are extracted from the communication channel by despreading the composite signal energy in the communication channel with the user spreading code associated with the transmitted signal to be extracted. The transmitted signal is divided into a number of "frames", each of which includes a specified number of information bits. It is generally possible to transmit the information bits within each frame at any one of a number of predetermined data rates.

Implementation of spread spectrum, e.g., CDMA, cellular systems capable of providing adequate service to a particular geographic region generally involves consideration of a number of factors bearing upon system performance. For example, it is generally necessary to consider the extent of the available frequency spectrum, as well as the potential for coordination with other nearby communication systems. In addition, constraints imposed by thermal noise and interference generated by the various subscriber units needs to be taken into consideration. Estimates of interference are of particular concern within CDMA systems, since power is transmitted by the subscriber units over the same bandwidth irrespective of location within the cellular coverage area.

Interference on the communication channels linking a particular base station and the subscriber units within a given cell can arise when neighboring cells use the same or an adjacent CDMA radio channels as those used within the given cell. In order to evaluate system performance under realistic conditions, a selected number of subscriber units may be deployed at various distances from multiple base stations as a means of estimating various levels of channel interference. During system deployment, the quality of signal transmission at various distances from a base station may be determined on the basis of qualitative characterization of the received signal by subscriber unit users. Various system parameters (e.g., transmitted power level) may then be adjusted in order to improve communication quality.

However, it is anticipated that quantitative measurement of the capability of a digital communication channel to carry particular types of information (e.g., variable or fixed-rate frame data) would enable more precise evaluation of system performance. That is, quantitative measurements of system performance would allow for accumulation of performance data more accurate than the subjective characterizations of received signal quality solicited from actual subscriber users. For example, subjective evaluations of signal quality do not allow for determination of transmission statistics (e.g., frame error rate at various data rates). In addition, qualitative estimation of signal quality does not allow for real-time detection of channel degradation giving rise to bit error rates in excess of a predetermined threshold. This capability would facilitate, for example, identification of particular frames of digital data as being so "corrupted" so as to be unusable if a desired level of accuracy is to be maintained.

Accordingly, it is an object of the invention to provide a system for quantitatively evaluating the quality of communication channels within a digital communication system.

SUMMARY OF THE INVENTION

The present invention provides a system and method for testing signal transmission quality within a digital communication system. In an exemplary embodiment the present invention may be incorporated within a digital cellular communication system in which information is exchanged over spread spectrum communication channels, among a plurality of mobile users, via at least one cell-site.

The present invention contemplates testing a digital communication channel by transmitting a test sequence of digital data over the communication channel. The test sequence of digital data transmitted over the communication channel is received at a receiving station, within which is also generated a replica of the test sequence of digital data. The accuracy of transmission over the communication channel is then determined by comparing the replica of the test sequence of digital data to the test sequence of data received over the communication channel.

The present invention allows the test sequence of digital data to be transmitted at one of a set of known data rates, with the receive station being disposed to identify the data rate associated with each test sequence of digital data. In order to simulate the transmission of, for example, voice data, the system may be configured such that each test sequence of digital data is generated in accordance with a pseudorandom process.

In a preferred implementation transmission of the test sequence involves generating a first plurality of data packets, which collectively comprise the test sequence of digital data. Each data packet is assigned one of a multiplicity of data rates in accordance with a first pseudorandom process, and is then transmitted at the data rate assigned thereto. In an exemplary implementation the bit sequences within each data packet are generated on the basis of a second pseudorandom process.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. System Overview

Figure 1:
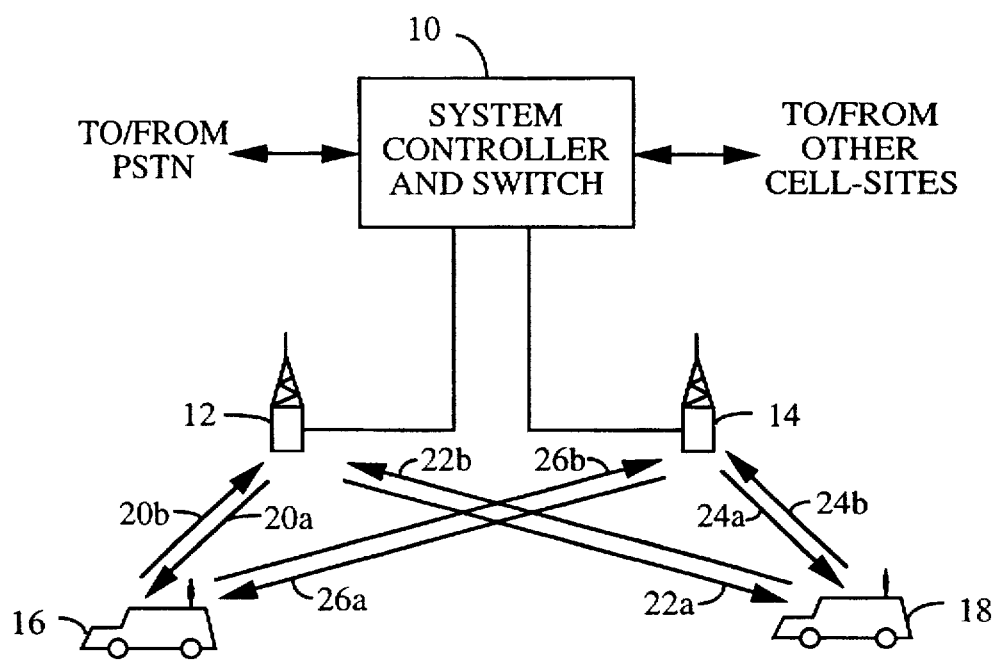
FIG. 1 shows an exemplary cellular subscriber digital communication system within which the communication channel testing technique of the present invention may be employed.

An exemplary cellular subscriber digital communication system within which the communication channel testing technique of the present invention may be employed is illustrated in FIG. 1. The system of FIG. 1 may utilize, for example, spread spectrum or other modulation techniques familiar to those skilled in the art to facilitate communication between users of the mobile units (e.g., mobile telephones), and the cell-sites. In FIG. 1, system controller and switch 10 typically includes interface and processing circuitry for providing system control to the cell-sites. When the system of FIG. 1 is configured to process telephone calls, controller 10 operates to route telephone calls from the public switched telephone network (PSTN) to the appropriate cell-site for transmission to the appropriate mobile unit. In this instance controller 10 also functions to route calls from the mobile units, via at least one cell-site, to the PSTN. Controller 10 may connect calls between mobile users via the appropriate cell-sites since the mobile units do not typically communicate directly with one another.

Controller 10 may be coupled to the cell-sites by various means such as dedicated telephone lines, optical fiber links or microwave communication links. In FIG. 1, two such exemplary cell-sites 12 and 14, along with mobile units 16 and 18, are illustrated. Cell-sites 12 and 14 as discussed herein and illustrated in the drawings are considered to service an entire cell. However it should be understood that the cell may be geographically divided into sectors with each sector treated as a different coverage area. Accordingly, handoffs are made between sectors of a same cell as is described herein for multiple cells, while diversity may also be achieved between sectors as is for cells.

In FIG. 1, arrowed lines 20a–20b and 22a–22b respectively define the possible communication links between cell-site 12 and mobile unit 16 and 18. Similarly, arrowed lines 24a–24b and 26a–26b respectively define the possible communication links between cell-site 14 and mobile units 16 and 18. Cell-sites 12 and 14 nominally transmit using equal power.

The cell-site service areas or cells are designed in geographic shapes such that the mobile unit will normally be closest to one cell-site, and within one cell sector should the cell be divided into sectors. When the mobile unit is idle, i.e. no calls in progress, the mobile unit constantly monitors the pilot signal transmissions from each nearby cell-site, and if applicable from a single cell-site in which the cell is sectorized. As illustrated in FIG. 1, the pilot signals are respectively transmitted to mobile unit 16 by cell-sites 12 and 14 upon outbound or forward communication links 20a and 26a. Mobile unit 16 can determine which cell it is in by comparing signal strength in pilot signals transmitted from cell-sites 12 and 14.

Voice transmission by each mobile unit is initiated by providing the mobile user analog voice signal to a digital vocoder. The vocoder output is then, in sequence, convolutional forward error correction (FEC) encoded, 64-ary orthogonal sequence encoded and modulated on a PN carrier signal. The 64-ary orthogonal sequence is generated by a Walsh function encoder. The encoder is controlled by collecting six successive binary symbol outputs from the convolutional FEC encoder. The six binary symbol outputs collectively determine which of the 64 possible Walsh sequences will be transmitted. The Walsh sequence is 64 bits long. Thus, the Walsh "chip" rate must be 9600●3●(⅙)●64=307200 Hz for a 9600 bps (9.6 kbps) data transmission rate.

In the mobile-to-cell link (i.e., the "reverse" link) a common short PN sequence is used for all voice carriers in the system, while user address encoding is done using the user PN sequence generator. The user PN sequence is uniquely assigned to the mobile for at least the duration of each call. The user PN sequence is exclusive-OR'ed with the common PN sequences, which are length 32768 augmented maximal linear shift register sequences. The resulting binary signals then each bi-phase modulate a quadrature carrier, are summed to form a composite signal, are bandpass filtered, and translated to an IF frequency output. In the exemplary embodiment, a portion of the filtering process is actually carried out by a finite impulse response (FIR) digital filter operating on the binary sequence output.

The modulator output is then power controlled by signals from the digital control processor and the analog receiver, converted to the RF frequency of operation by mixing with a frequency synthesizer which tunes the signal to proper output frequency, and then amplified to the final output level. The transmit signal is then passed on to a duplexer and an antenna. Although the present invention may be embodied within a spread spectrum communication system, the principles of the invention are described with reference to the generalized representation of a digital communication system as depicted in FIGS. 2A and 2B.

II. Transmission of Test and Information Data

Figure 2A:
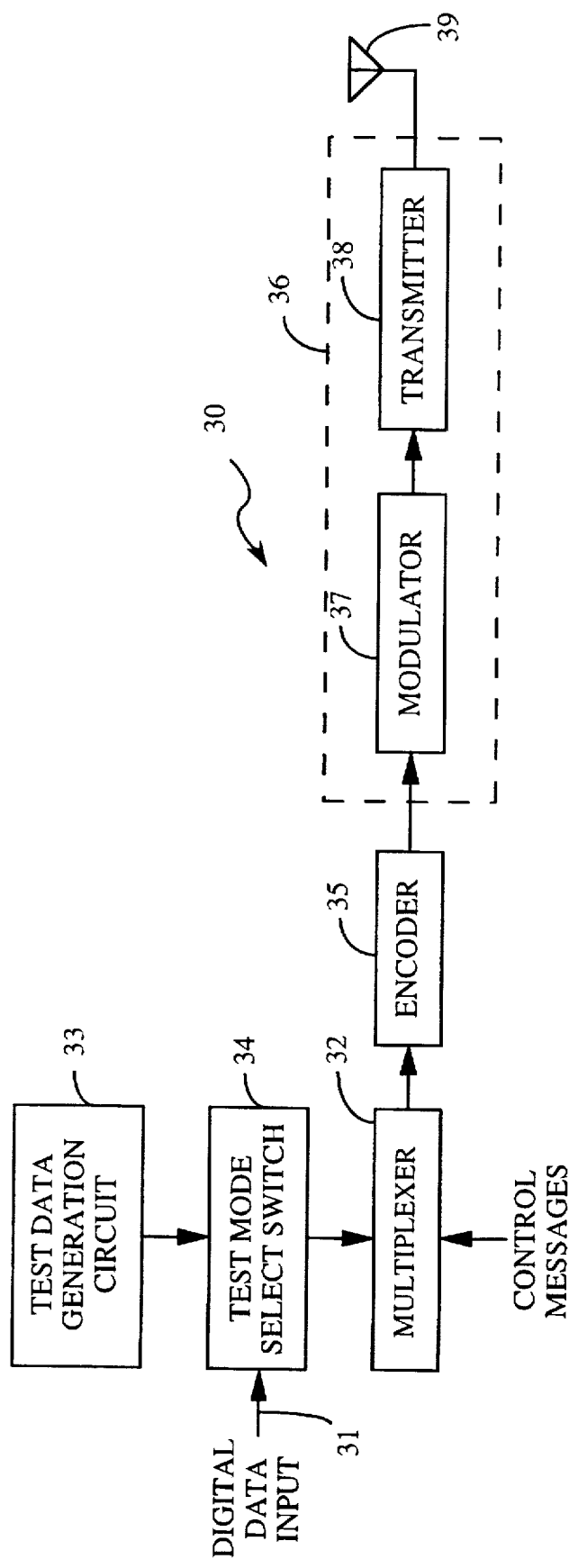
FIG. 2A illustrates a preferred implementation of a mobile unit transmit modulator within which a transmit portion of the digital communication test system of the invention is embodied.
Figure 2B:
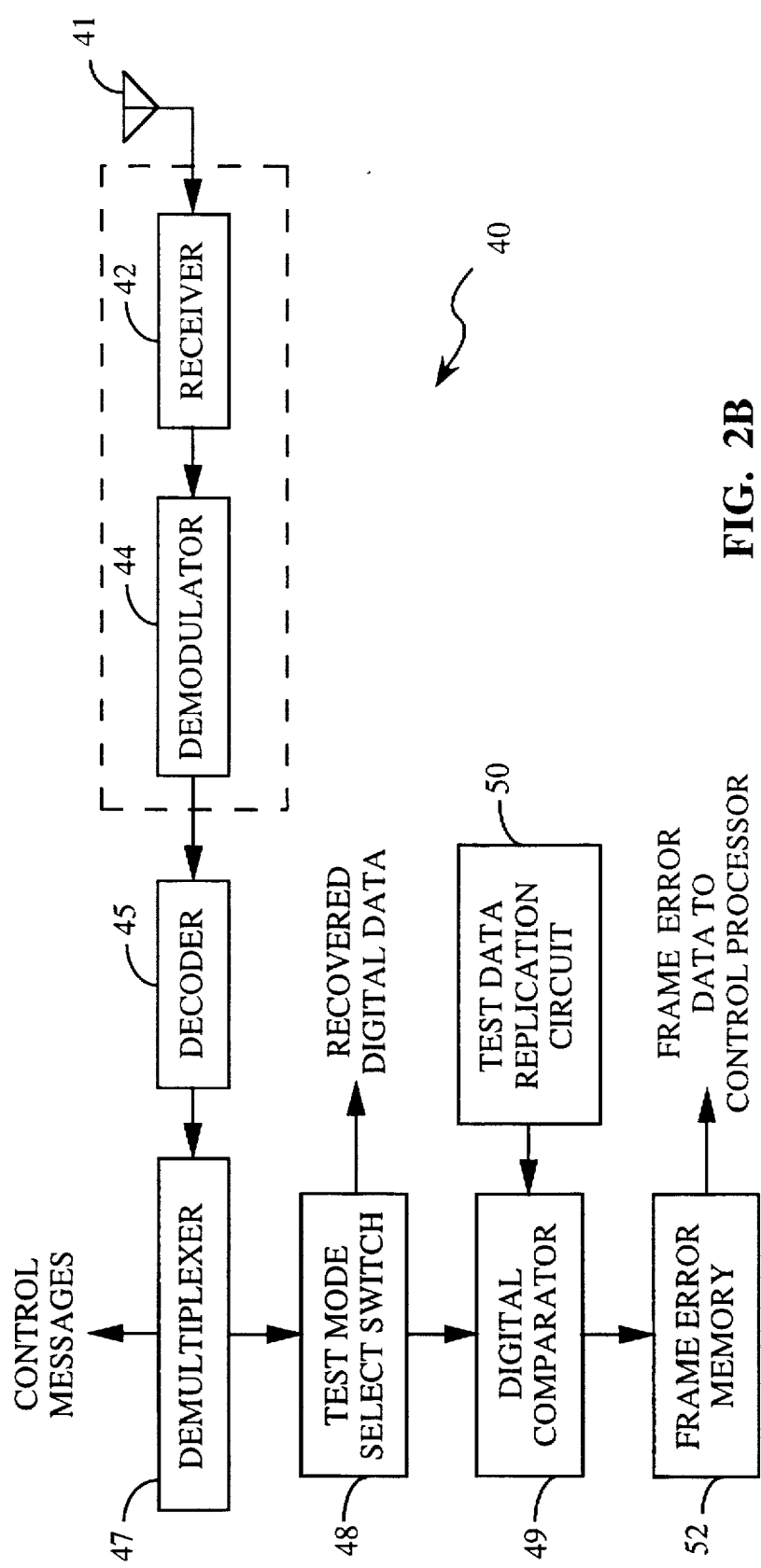
FIG. 2B shows a block diagram of a cell-site receiver operative to receive transmissions from the mobile units deployed within an associated cell or sector.

FIG. 2A illustrates a preferred implementation of a mobile unit transmit modulator 30 in which a transmit portion of the digital communication test system of the invention is embodied. During normal operation the transmit modulator processes digital information data, e.g., voice information from a vocoder to multiplexer 32. As is described below, multiplexer 32 allows control messages and the like to be transmitted along with test data during a "dim and burst" phase of test mode operation. In a test mode of operation, a test mode select switch 34 is toggled in response to instructions received from a control processor (not shown) such that transmit modulator 30 operates upon a test sequence of pseudorandom data provided by a test data generation circuit 33.

Referring again to FIG. 2A, in normal operation of the mobile unit the test mode select switch 34 is set such that only the input line 31 is connected to the encoder/interleaver 35 by way of multiplexer 32. During both normal and test mode operation the encoder/interleaver 35 performs a block interleaving operation. During normal mode operation the interleaving interval will preferably be performed over an interval equivalent to the duration of a single "frame" of data received from, for example, a vocoder via input line 31. An exemplary frame structure is described in, for example, copending U.S. patent application Ser. No. 08/117,279, entitled "METHOD AND APPARATUS FOR THE FORMATTING OF DATA FOR TRANSMISSION", assigned to the assignee of the present invention, the disclosure of which is herein incorporated by reference. Further details on an exemplary frame structure can be found in the publication TIA/EIA Interim Standard "Mobile Station-Base Station Compatibility Standard for Dual-Mode Wideband Spread Spectrum Cellular System", TIA/EIA/IS95, July 1993.

Accompanying each vocoder frame is a predetermined cyclic redundant check (CRC) code of a type familiar to those skilled in the art. The CRC code is utilized in a decoding process (described below) to identify bit errors occurring during transmission over the communication channel. As is described hereinafter, the communication channel testing technique contemplated by the invention may be employed concurrently with such conventional error detection techniques in order to enable a more thorough assessment to be made of channel accuracy.

Referring again to FIG. 2A, in test mode operation the encoder/interleaver 35 operates over the interleaving interval identical to that used during normal mode operation. However, during test mode a single "packet" of test data, rather than a frame of vocoder data, is processed by the encoder/interleaver 35.

In an exemplary embodiment each packet of test data provided by the test generation circuit 33 comprises a pseudorandom bit sequence of predetermined length. After encoding of the pseudorandom test data and subsequent transmission over a communication channel to a receive station, the received test data is compared to a replica thereof synchronously generated within the receive station. In accordance with the invention, the integrity of data transmission over the communication channel may then be evaluated on the basis of this comparison between the received and locally-generated versions of the test data.

Considering now the operation of the encoder/interleaver 35 in greater detail, in a specific embodiment the encoder/interleaver 35 is disposed to generate a code sequence output using a 64-ary orthogonal signaling technique. In 64-ary orthogonal signaling a set of 64 possible characters is available for data encoding, with each character being encoded into a length 64 sequence containing 64 binary bits or "chips". The number of code symbols produced in an exemplary 20 msec interleaving period, assuming a data rate of 9.6 kbps and a code rate r=⅓, is 576. The code symbols are written into the interleaver memory array by rows and read out by columns. Code repetition may be used to accommodate four different data rates produced by the vocoder on a 20 msec frame basis. However, the repeated code symbols are not transmitted over the air at lower energy levels, rather only one code symbol of a repetition group is transmitted at the nominal power level. That is, the code repetition in the exemplary embodiment is used merely as an expedient to fit the variable data rate scheme in the interleaving and modulation structure.

Referring again to FIG. 2A, during both normal and test mode operation the encoded data from encoder 35 is provided to a transmit modulator 37. The modulator circuit 37 operates upon the digital output from encoder 35 using a modulation format consisting of, for example, 64-ary orthogonal signalling. In other words, the interleaved code symbols are grouped into groups of six to select one out of 64 orthogonal waveforms.

In an exemplary implementation the data modulation time interval is equal to 208.33 μsec, and is referred to as a Walsh symbol interval. At 9.6 kbps, 208.33 μsec corresponds to 2 information bits and equivalently to 6 code symbols at a code symbol rate equal to 28800 sps. The Walsh symbol interval is subdivided into 64 equal length time intervals, referred to as Walsh chips, each lasting 208.33/64=3.25 μsec. The Walsh chip rate is then ⅓.25 μsec=307.2 kHz. For a specific PN spreading rate of 1.2288 MHz, there are exactly 4 PN chips per Walsh chip.

As is indicated by FIG. 2A, the transmit modulator 36 also includes a transmitter 38 coupled to the modulator circuit 37. A carrier signal generated within the transmitter 38 is modulated by the digital sequence output by the modulator circuit 37. The resulting modulated carrier is then transmitted via antenna 39 to a cell-site station receiver 40 (FIG. 2B). In an exemplary embodiment the digital test packet associated with each frame is extracted from the signal received at the cell-site and compared with a locally-generated test packet replica. In a preferred embodiment the results of this comparison are then utilized by a cell-site control processor in computation of error statistics related to the accuracy of data transmission over the communication channel linking the mobile unit and cell-site station.

It is a feature of the present invention that the "forward link" from the cell-site to the mobile unit may be tested independently from the "reverse", or "mobile-to-cell" link. Specifically, when it is desired to evaluate the accuracy of the reverse link, the reverse link test packets are transmitted from the mobile unit and evaluated at the cell-site. When testing the forward link, test packets transmitted from the cell-site are received and analyzed at the mobile unit.

III. Reception of Test and Information Data

Referring to FIG. 2B, there is shown a block diagram of a cell-site receiver 40 operative to receive transmissions from the mobile units deployed within an associated cell or sector. During both normal and test mode operation, the signals transmitted by mobile units and received on antenna 41 are provided to analog receiver 42. Within the receiver 42 the signals received from the antenna 41 are amplified, downconverted to an intermediate frequency, bandpass filtered, and sampled by an analog to digital converter.

In an exemplary CDMA implementation of the cell-site receiver 40, the timing of the received signal is tracked using, for example, the well known technique of correlating the received signal by a slightly early local reference PN code and correlating the received signal with a slightly late local reference PN code. The difference between these two correlations will average to zero if there is no timing error. Conversely, if there is a timing error, then this difference will indicate the magnitude and sign of the error and the receiver's timing is adjusted accordingly.

The digitized output from the receiver 42 is seen to be provided to a demodulator 44. The digital code sequences generated within demodulator 44 in response to the received signal energy are provided to a decoder/deinterleaver 45 operative to identify the orthogonal code sequences transmitted by a particular mobile unit. That is, the decoder/deinterleaver 45 recovers the input digital data transmitted by the transmit modulator 30 (FIG. 2A) and provides the result to a demultiplexer 47. When both control message and test information have been transmitted during a "dim and burst" phase of test mode operation, the demultiplexer 47 identifies the first bit of each concatenated frame of test/message data. The composite bit sequence comprising each concatenated frame is then bifurcated into sequences of received control message data and a received packet of digital test data. As is indicated by FIG. 2B, the received control message data is output by demultiplexer 47 to the cell-site control processor during "dim and burst" test mode operation.

The demultiplexer 47 provides received test and message data to a test mode select switch 48 during test and normal mode operation, respectively. Operation of the switches 32 and 48 is synchronized such that during normal mode operation the test mode select switch 48 is set so as to route the recovered digital signal data output by decoder/deinterleaver 45 to the cell-site control processor. During test mode operation, switch 48 effectively links the output of the decoder/deinterleaver 45 to a digital comparator 49.

As is indicated by FIG. 2B, the digital comparator 49 also receives a locally-generated replica of the received test packet from a test data replication circuit 50. In the preferred implementation the cell-site control processor adjusts the timing of the test data replication circuit 50 so as to establish synchronization with the test data generation circuit 33. The digital bit sequences comprising the received test packet and replicated test packet associated with a given frame are then compared within comparator 49.

As is indicated by FIG. 2B, the results of each such comparison are stored within frame error memory 52. The frame error memory 52 will preferably be capable of storing the number of "bit errors" existing between corresponding bits of the received and replicated test data sequences associated with a particular frame. As is described hereinafter, the information within frame error memory 52 may then be utilized by the cell-site control processor to compute a desired set of frame error statistics.

IV. Test Packet Generation

As is discussed below, the present invention advantageously allows testing to be performed without modification of existing signaling formats. That is, conventional frame category indications are provided with accompanying test sequences are generated for transmission over the communication link during test mode operation. Moreover, the capability of the present invention to provide test packets of variable rate enables evaluation of the capability of a communication channel to carry voice data and the like.

As mentioned above, either fixed-rate or variable-rate data may be provided by test data generation circuit 33 during test mode operation. In an exemplary implementation the data generation and replication circuits 33 and 50 are capable of generating test packets of digital data at a set of predetermined rates (e.g., 9.6 kbps, 4.8 kbps, 2.4 kbps or 1.2 kbps). In what follows a data rate of 9.6 kbps will be considered to be "full-rate" data (i.e., Rate 1), a data rate of 4.8 kbps to be "half-rate" data (i.e., Rate ½), a data rate of 2.4 kbps will be considered to be "quarter-rate" data (i.e., Rate ¼), and a data rate of 1.2 kbps will be considered to be "eighth-rate" data (i.e., Rate ⅛). With the exception of "dim and burst" operation in which control messages are combined within multiplexer 32 together with a less than full-rate test sequence, during fixed-rate testing the bit sequences comprising each test packet will normally be transmitted at the same rate.

In accordance with one aspect of the invention, voice communication is simulated by selecting the rate at which consecutive packets of test data are transmitted on the basis of a four-state, second order Markov process in which the current Markov "state" is a function of the data rates of the preceding two test packets. It is understood, however, that in alternate embodiments Markov processes of differing order and/or state may be employed. In the case of a second order Markov process, an equivalent representation using a sixteen-state, first order Markov chain may be utilized. Each state within the model is defined by the speech rates (e.g., full-rate, half-rate, quarter-rate or eighth-rate) associated with a preceding pair of consecutive speech frames. For example, in what follows state "0" corresponds to a preceding pair of consecutive frames characterized by full-rate speech activity. TABLE I below sets forth the pair of preceding speech rates defining each such Markov state.

TABLE I

| Frame Rate for Previous Frame (N-1) | Frame Rate for Current Frame (N) | Markov State |
|---|---|---|
| 1 | 1 | 0 |
| 1 | ½ | 1 |
| 1 | ¼ | 2 |
| 1 | ⅛ | 3 |
| ½ | 1 | 4 |
| ½ | ½ | 5 |
| ½ | ¼ | 6 |
| ½ | ⅛ | 7 |
| ¼ | 1 | 8 |
| ¼ | ½ | 9 |
| ¼ | ¼ | 10 |
| ¼ | ⅛ | 11 |
| ⅛ | 1 | 12 |
| ⅛ | ½ | 13 |
| ⅛ | ¼ | 14 |
| ⅛ | ⅛ | 15 |

Accordingly, during testing designed to approximate voice communication the data rate of each test packet is selected in accordance with the pseudorandom process represented by TABLE I. As will be explained below, the bit sequences within data packets used in both fixed-rate and variable-rate testing are also generated using a specified pseudorandom process. Synchronization of the bit sequence generation processes performed using the data generation and replication circuits 33 and 50 enables an exact replica of each transmitted data packet to be produced within the cell-site.

Referring now to TABLE II, there are listed the number of bits included within the sequences comprising a set of exemplary data packets transmitted at various data rates. For example, in the embodiment represented by TABLE II a Rate 1 packet includes a bit sequence of 171 bits transmitted at the full-rate (e.g., 9.6 kbps). A Rate ½ packet is transmitted at one-half of the full rate (e.g., 4.8 kbps), a Rate ¼ packet is transmitted at one-quarter of the full-rate (e.g., 2.4 kbps), a Rate ⅛ packet is transmitted at one-eighth of the full-rate (e.g., 1.2 kbps). The encoder/interleaver 35 is programmed to repeat code symbols for data rates less than the full-rate. Each symbol will be output 1, 2, 4 or 8 times for full, half, quarter or eighth rate packets of test data, respectively. Accordingly, the number of bits included within each packet (i.e., packet size) of test data varies in the manner indicated by TABLE II in order that the product of the data rate and packet size remains constant. In this way an equivalent number of code symbols per frame is established, with appropriate code symbol repetition occurring for frames in which the data rate is less than full-rate.

TABLE II

| Packet Type | Test Bits per Frame |
|---|---|
| Rate 1 | 171 |
| Rate ½ | 80 |
| Rate ¼ | 40 |
| Rate ⅛ | 16 |
| Blank | 0 |

As noted above, during "dim and burst" test data transmission the multiplexer 32 combines a control message with the test bits comprising a less than full-rate (i.e., Rate ½, Rate ¼ or Rate ⅛) data packet. In an exemplary embodiment, during "dim and burst" mode operation the concatenated control message and test data of each frame are transmitted at the full-rate. For example, when a Rate ⅛ test packet (i.e., 16 bits of test data) is generated a relatively lengthy packet of control message data (i.e., 152 bits of control message data) are combined in the frame for transmission. In this way the number of test bits transmitted is "dimmed" in order to enable a "burst" of control message information to be communicated during the testing process.

Under certain circumstances it may be desired to transmit a control message having a length spanning an entire frame. In this case a "blank and burst" frame including only control message information (i.e., 0 bits of test data) is transmitted by the mobile unit. In an exemplary embodiment a flag (in the form of overhead bits) is set so as to specify the size of the test packet and control message data transmitted during a "dim and burst" phase of operation. Similarly, "blank and burst" transmissions are also identified by the setting a flag within an ancillary transmitted field (i.e., overhead bits). Details on the flag in the frame structure may be found in the technical standard TIA/EIA/IS-95 and in the above mentioned pending application Ser. No. 08/117,279.

V. Test Packet Replication

Within the cell-site receiver 40, the bit rate of each received data packet is determined by the decoder 45. In an exemplary embodiment the decoder 45 is operative to implement a Viterbi decoding algorithm in which the most likely decoding sequence is determined with respect to each received packet of test data. Since the decoder 45 is not provided with a priori knowledge of the degree of code symbol repetition associated with each received frame, it is necessary to attempt decoding at each possible data rate. An exemplary Viterbi decoder is described in copending U.S. patent application Ser. No. 08/126,477, entitled "MULTI-RATE SERIAL VITERBI DECODER FOR CDMA SYSTEM APPLICATIONS", which is assigned to the assignee of the present invention and which is herein incorporated by reference.

Subsequent to identification of the data rate associated with a particular received frame, the test data replication circuit 50 supplies a locally-generated packet of test data of the appropriate type to the digital comparator 49. Specifically, a frame category indicative of either a Rate 1, Rate ½, Rate ¼, Rate ⅛, Blank, Rate 1 with Bit Error or an Insufficient Frame Quality is provided by the circuit 50 to comparator 49. In addition, TABLE III lists the number of bits within the test packet of a given frame category provided to the comparator 49 in the absence of dim and burst or blank and burst transmission. The first five types of locally-generated packets listed in TABLE III correspond to the five types of transmitted packets enumerated in TABLE II. For example, a Rate 1 packet is supplied to the comparator 49 by the replication circuit 50 when it is determined that a full-rate frame of test data was received without any detected CRC error. Again, during decoding of each received frame the CRC code information received therewith is processed using conventional techniques in order to identify bit errors arising during transmission.

Similarly, Rate ½, Rate ¼ and Rate ⅛ packets are provided by the replication circuit 50 to the comparator 49 when it is determined that one-half rate, one-quarter rate and one-eighth rate frames have been received in the absence of CRC error, respectively. A blank packet is supplied to the comparator 49 when it is determined that the "blank and burst" flag of a received frame has been set. If the detected CRC error is such that the quality of the received frame is deemed insufficient to allow for accurate rate determination, an erasure frame is provided by the test data replication circuit 50. The erasure frame as provide contains no bits.

TABLE III

| Packet Type | Test Bits per Packet |
| --- | --- |
| Rate 1 | 171 |
| Rate ½ | 80 |
| Rate ¼ | 40 |
| Rate ⅛ | 16 |
| Blank | 0 |
| Rate 1 with Bit Errors | 171 |
| Insufficient Frame Quality (Erasure) | 0 |

The test packet generated by test data replication circuit 50 is in accordance with the data packet generation algorithm discussed below. As noted above, during "dim and burst" mode operation a flag is set which is indicative of the size of the test packet and accompanying control message data. This allows a test packet of the appropriate size to be supplied to the digital comparator 49, subsequent to demultiplexing of the control message from the received test sequence.

VI. Data Packet Generation

In a preferred embodiment the test data generation and replication circuits 33 and 50 are operative to create the bit sequences within each packet of test data by generating identical pseudorandom sequences of predetermined length. In particular, the circuits 33 and 50 are disposed to generate a 31-bit pseudorandom number for each data packet in accordance with the following linear congruential generator:

$$x_n = (a) \bullet (x_{n-1})(\text{mod } m)$$

where $x_{n-1}$ and $x_n$ denote successive integer outputs of the generators. In a preferred implementation the parameters "a" and "m" are selected such that $a = 7^5 = 16807$, and $m = 2^{31} - 1 = 2147483647$.

During testing of the reverse link channel between the mobile unit transmitter 30 and the cell-site receiver 40, the identical random number generators within the circuits 33 and 50 are re-initialized each time the least significant 9 bits of the result of a predefined exclusive-OR operation become equivalent to the least significant 9 bits of a 32-bit electronic serial number (ESN) uniquely identifying a particular mobile unit. Specifically, reinitialization of the random number generation occurs each time the least significant 9 bits of a bit-wise exclusive-OR of the Frame Number (i.e., # of frames transmitted since last initialization) with a predefined mask sequence (e.g., '0101 0101 0101 0101 0101 0101 0101 0101') become identical to the least significant 9 bits of the ESN. Different seeds are used to reinitialize the random number generators for the Forward Traffic Channel and the Reverse Traffic Channel. The initial "seed" value of $x_0$ is chosen based to be equivalent to the result of the bit-wise exclusive-OR of the 32-bit Frame Number at re-initialization with a reverse link "seed" mask (e.g., '0101 0101 0101 0101 0101 0101 0101 0101').

During each re-initialization the random number generators are iterated three times prior to producing a value (i.e., $x_3$) used as the first, or for Rate ⅛ packets as the only, one of a string of one or more concatenated random numbers included within a first frame. Such multiple iterations ensure that the test sequences generated at neighboring mobile stations using identical processes will be appropriately decorrelated. During variable-rate testing, the first random number produced (i.e., $x_3$) is also used for selection of the data rate of the first frame in a manner described below. These initial three iterations are performed as follows:

$x_0$ = seed, $x_1 = a \bullet x_0 \text{ mod } m$, $x_2 = a \bullet x_1 \text{ mod } m$, and $x_3 = a \bullet x_2 \text{ mod } m$.

Each value of $x_n$ may be transformed into a corresponding 24-bit pseudo-random number, $y_n$, by taking the 24 most significant bits of $x_n$. That is, $y_n$ is the integer part of $x_n/128$. The $n^{th}$ such 24-bit number, $y_n$, can be expressed in binary form as follows:

$$y_{n,23} \, y_{n,22} \, y_{n,21} \, y_{n,20} \cdots y_{n,3} \, y_{n,2} \, y_{n,1} \, y_{n,0}$$

where $y_{n,23}$ denotes the most significant bit of $y_n$.

Again with respect to variable-rate testing, for Rate 1 frames, the random number generator is iterated six times further following production of the term $X_3$ in order to provide the remaining bits included within the test packet sequence. The Rate 1 packet is comprised of the 24 bit values $y_3$ through $y_9$ in addition to three predetermined bits, preferrably all "0's" to fill out the 171 bit test packet. For Rate ½ packets the random number generator is iterated three times further following production of the term $x_3$ in order to provide the remaining bits included within the test packet sequence. The Rate ½ packet is comprised of the 24 bit values $y_3$ through $y_6$ and the 8 most significant bits of the value $y_5$ to fill out the 80 bit test packet. For Rate ¼ packets the random number generator is iterated once further following production of the term $x_3$ in order to provide the remaining bits included within the test packet sequence. The Rate ¼ packet is comprised of the 24 bit value $y_3$ through $y_5$ and the 16 most significant bits of the value $y_4$ to fill out the 40 bit test packet. For Rate ⅛ data frames the 16 most significant bits of the random number $y_3$ corresponding to the initial value $x_3$ comprises the entire test packet sequence. It should be noted that when a Rate 1 packet is selected and there is control message data, e.g., signalling or secondary traffic data, to be sent in a "dim and burst" phase of test mode operation a Rate 1 test packet is generated as described above, but a Rate ½ packet is provided to multiplexer 32. Furthermore when there is control message data to be sent in a "blank and burst" phase of test mode operation a Rate 1 test packet is generated but a blank packet (i.e., 0 bits of test data) is provided.

In fixed rate testing the same rate test packet is generated for all frames during the test at the selected fixed rate. For example, at 9.6 kbps, 4.8 kbps, 2.4 kbps, or 1.2 kbps, the random number generator is iterated seven times for Rate 1, four times for Rate 2, twice for Rate ¼, and once for Rate ⅛, respectively as discussed above in order to provide the requisite number of test bits.

In alternate embodiments the forward communication link between the cell-site station and the mobile station may be tested concurrently with, or instead of, the reverse communication link between the mobile station and the cell-site. When testing the forward link, a transmitter substantially identical to the transmitter 30 (FIG. 2A) is included within the cell-site and a receiver substantially identical to the receiver 40 (FIG. 2B) is placed within the mobile unit. In a preferred implementation the random number generation process employed during forward link testing is re-initialized upon the least significant 9 bits of the result of the bit-wise exclusive-OR of the Frame Number with a forward link mask (e.g., '0010 1010 1010 1010 1010 1010 1010 1010') becoming equivalent to the least significant 9 bits of the mobile station ESN. Accordingly, although re-initialization of the forward and reverse link random number generation processes will occur at different times, each process will be reinitialized once every 512 frames.

VII. Frame Rate Selection

Referring again to TABLE I, in an exemplary embodiment a series of test packets designed to emulate speech are generated at rates selected in accordance with a 16-state first order Markov chain. The state of the Markov chain is defined by the data rates associated with the two preceding test packets, as indicated by TABLE I. As may be appreciated from TABLE I, each state is capable of transitioning into one of at most four states at the conclusion of a particular frame. For example, since "state 0" exists when the rates of the $N^{th}$ (i.e., current) frame and of the rate of the $(N-1)^{th}$ frames are 1, the rate of the $(N+1)^{th}$ frame of any state into which state 0 transitions must also be 1. Hence, state 0 can transition only into states 0, 1, 2 and 3; and state 1 can transition only into states 4, 5, 6 and 7. In general, state "M" can transition into at most states (4●M) modulo 16, (4●M+1) modulo 16, (4●M+2) modulo 16, and (4●M+3) modulo 16.

Referring now to TABLE IV, there is compiled a set of cumulative probabilities indicative of the likelihood that an $(N+1)^{th}$ speech frame will be of a particular rate as a function of the Markov state existing at the $N^{th}$ speech frame. Each of the cumulative probabilities within TABLE IV are scaled to fall within the range of 0 to 32,768. That is, an entry of 32,768 corresponds to a probability of unity, an entry of 0 corresponds to a cumulative probability of zero, and so forth. For example, assuming that the Markov state of the $N^{th}$ frame is 0, TABLE IV specifies that there exists zero probability that the data rate of the $(N+1)^{th}$ frame will be either ⅛ Rate or ¼ Rate. Similarly, there is a probability of 2916/32,768 that the $(N+1)^{th}$ frame will be ½ Rate, and a probability of (32,768−2916)/32,768 that the $(N+1)^{th}$ frame will be full-rate. The entries within TABLE IV are representative of an exemplary set of empirically derived speech parameters, it being understood that the values of such entries could be modified so as to model other variable rate processes.

TABLE IV

| State of | Cumulative Probability of (N + 1)$^{st}$ Frame Rate | | |
|---|---|---|---|
| Nth Frame | Rate ⅛ | Rate ¼ or ⅛ | Rate ½, ¼ or ⅛ |
| 0 | 0 | 0 | 2916 |
| 1 | 0 | 20906 | 25264 |
| 2 | 0 | 0 | 0 |
| 3 | 0 | 0 | 0 |
| 4 | 0 | 0 | 4915 |
| 5 | 0 | 17170 | 24969 |
| 6 | 21856 | 25887 | 27099 |
| 7 | 0 | 0 | 0 |
| 8 | 0 | 0 | 4522 |
| 9 | 0 | 5472 | 16384 |
| 10 | 21856 | 21856 | 24576 |
| 11 | 28246 | 29622 | 30802 |
| 12 | 0 | 0 | 5472 |
| 13 | 0 | 6554 | 6554 |
| 14 | 28377 | 28934 | 29491 |
| 15 | 29753 | 32473 | 32571 |

The 24-bit pseudorandom number $y_n$ which, as noted above, comprises all or part of the test packet sequence of a given frame, may also be used facilitate random selection of the data rate of each succeeding frame. In particular, a pseudo-random number $z_r$ is formed from the 15 least significant bits of the 24-bit random number $y_n$ associated with the $N^{th}$ frame, and hence ranges in value from 0 to 32,768. The data rate of the $(N+1)^{th}$ frame is determined by comparing the value of $z_r$ to the entries in the row of TABLE IV corresponding to the Markov state of the $N^{th}$ frame. In general, a rate $R_i$ is chosen if the value of $z_r$ is greater than or equal to the column "i-1", and is less than the entry in the "$i^{th}$" column.

As an example, TABLE IV indicates that if the Markov state of the $N^{th}$ frame is 6 and $z_r$ is less than 21856, then the data rate of the $(N+1)^{th}$ frame is selected to be Rate ⅛. That is, a Rate ⅛ test packet is generated within the test generation and replication circuits during the $(N+1)^{th}$ frame. Again considering the case of the Markov state of the $N^{th}$ frame being 6, when $z_r$ is greater than or equal to 21856 but less than 25887, the data rate of the $(N+1)^{th}$ frame is selected to be Rate ¼ and a Rate ¼ test packet is generated. Similarly, if $z_r$ is greater than or equal to 25887 but less than 27099, the data rate of the $(N+1)^{th}$ frame is selected to be Rate ½ and a Rate ½ test packet is generated. Finally, if $z_r$ is greater than or equal to 27099, the data rate of the $(N+1)^{th}$ frame is selected to be Rate 1 and a Rate 1 test packet is generated.

In an exemplary embodiment, the Markov chain is set to state 15 upon initialization of the test data generation circuits 33 and 50. Upon subsequent re-initialization of the random number generators within the circuits 33 and 50, the state of the Markov chain is again reset to state 15.

VIII. Accumulation of Frame Error Statistics

Referring now to TABLE V, there are listed a set of transmitted frame counters accumulated within a mobile unit control processor memory (not shown). The annotation $RT_n$ used within TABLE V denotes the data rate associated with the $N^{th}$ frame transmitted by the mobile unit subsequent to test initialization. For each frame transmitted after test initialization, the mobile unit control processor increments an appropriate one of the counters included within TABLE V.

Similarly, there are included within TABLE VI an exemplary set of received frame statistics accumulated within a base station control processor memory (not shown). The annotation $RR_n$ used within TABLE VI denotes the data rate associated with the $N^{th}$ frame received by the base station subsequent to test initialization. In addition, the term "CRC error" refers to CRC errors detected during the decoding process. Similarly, the phrase "test sequence error" indicates one or more bit errors were detected by digital comparator 49 during a bit-by-bit comparison of a received and a corresponding replicated test packet sequence. For each frame received after test initialization, the base station control processor increments an appropriate one of the counters included within TABLE VI. The counters within TABLE VI are incremented based on the results of up to several rate determination operations. These operations may include, for example, a Viterbi decoding process, CRC error checking, and various energy measurement techniques.

In an exemplary embodiment a first rate determination method is implemented using the above-referenced Viterbi decoding process carried out by the decoder 45. Bit errors undetected during Viterbi decoding but subsequently detected during the test data comparison performed within digital comparator 49 are also recorded within TABLE VI. In a particular implementation the contents of TABLE VI may be replicated within the base station control processor memory, and the contents of TABLE V replicated within the mobile station control processor memory.

TABLE V

| Counter Name | Description |
| --- | --- |
| MSO2_T1 | Number of Rate 1 packets transmitted for which $RT_n$ was a 1 |
| MSO2_T2 | Number of Rate ½ packets transmitted for which $RT_n$ was a ½ |
| MSO2_T3 | Number of Rate ¼ packets transmitted for which $RT_n$ was a ¼ |
| MSO2_T4 | Number of Rate ⅛ packets transmitted for which $RT_n$ was a ⅛ |
| MSO2_T5 | Number of "dim and burst" packets transmitted for which $RT_n$ was a 1 |
| MSO2_T6 | Number of "dim and burst" packets transmitted for which $RT_n$ was a ½ |
| MSO2_T7 | Number of "dim and burst" packets transmitted for which $RT_n$ was a ¼ |
| MSO2_T8 | Number of "dim and burst" packets transmitted for which $RT_n$ was a ⅛ |
| MSO2_T9 | Number of "blank and burst" packets transmitted for which $RT_n$ was a 1 |
| MSO2_T10 | Number of "blank and burst" packets transmitted for which $RT_n$ was a ½ |
| MSO2_T11 | Number of "blank and burst" packets transmitted for which $RT_n$ was a ¼ |
| MSO2_T12 | Number of "blank and burst" packets transmitted for which $RT_n$ was a ⅛ |

TABLE VI

| Counter Name | Description |
| --- | --- |
| MSO2_R1 | Number of Rate 1 packets received in absence of CRC or test sequence errors given that $RR_n$ was a 1 |
| MSO2_R2 | Number of "dim and burst" packets received given that $RR_n$ was a 1 |
| MSO2_R3 | Number of "blank and burst" packets received given that $RR_n$ was a 1 |
| MSO2_R4 | Number of Rate ½ packets received without CRC errors, and in the absence of "dim and burst", given that $RR_n$ was a 1 |
| MSO2_R5 | Number of Rate ¼ packets received, in the absence of "dim and burst", given that $RR_n$ was a 1 |
| MSO2_R6 | Number of Rate ⅛ packets received, in the absence of "dim and burst", given that $RR_n$ was a 1 |
| MSO2_R7 | Number of Rate 1 packets received with detected CRC errors given that $RR_n$ was a 1 |
| MSO2_R8 | Number of packets received with insufficient frame quality given that $RR_n$ was a 1 |
| MSO2_R9 | Number of Rate 1 packets received in absence of CRC, but with detected test sequence errors, given that $RR_n$ was a 1 |
| MSO2_R10 | Number of Rate 1 packets received in the absence of CRC errors given that $RR_n$ was a ½ |
| MSO2_R11 | Number of "dim and burst" packets received given that $RR_n$ was a ½ |
| MSO2_R12 | Number of "blank and burst" packets received given that $RR_n$ was a ½ |
| MSO2_R13 | Number of Rate ½ packets received in the absence of CRC or test sequence errors given that $RR_n$ was a ½ |
| MSO2_R14 | Number of Rate ¼ packets received in the absence of "dim and burst" given that $RR_n$ was a ½ |
| MSO2_R15 | Number of Rate ⅛ packets received in the absence of "dim and burst" given that $RR_n$ was a ½ |
| MSO2_R16 | Number of Rate 1 packets received with detected test sequence errors given that $RR_n$ was a ½ |
| MSO2_R17 | Number of packets received with insufficient frame quality given that $RR_n$ was a ½ |
| MSO2_R18 | Number of Rate ½ packets received with detected test sequence errors given that $RR_n$ was a ½ |
| MSO2_R19 | Number of Rate 1 packets received in the absence of CRC errors given that $RR_n$ was a ¼ |
| MSO2_R20 | Number of "dim and burst" packets received given that $RR_n$ was a ¼ |
| MSO2_R21 | Number of "blank and burst" packets received given that $RR_n$ was a ¼ |
| MSO2_R22 | Number of Rate ½ packets received without CRC errors, and in the absence of "dim and burst", given that $RR_n$ was a ¼ |
| MSO2_R23 | Number of correct Rate ¼ packets received given that $RR_n$ was a ¼ |
| MSO2_R24 | Number of Rate ⅛ packets received in the absence of "dim and burst" given that $RR_n$ was a ¼ |
| MSO2_R25 | Number of Rate 1 packets received with detected test sequence errors given that $RR_n$ was a ¼ |
| MSO2_R26 | Number of packets received with insufficient frame quality given that $RR_n$ was a ¼ |
| MSO2_R27 | Number of Rate ¼ packets received with detected test sequence errors given that $RR_n$ was a ¼ |
| MSO2_R28 | Number of Rate 1 packets received in the absence of CRC errors given that $RR_n$ was a ⅛ |
| MSO2_R29 | Number of "dim and burst" packets received given that $RR_n$ was a ⅛ |
| MSO2_R30 | Number of "blank and burst" packets received given that $RR_n$ was a ⅛ |
| MSO2_R31 | Number of Rate ½ packets received without CRC errors, and in the absence of "dim and burst", given that $RR_n$ was a ⅛ |
| MSO2_R32 | Number of Rate ¼ packets received in the absence of "dim and burst" given that $RR_n$ was a ⅛ |
| MSO2_R33 | Number of correct Rate ⅛ packets received given that $RR_n$ was a ⅛ |
| MSO2_R34 | Number of Rate 1 packets received with detected test sequence errors given that $RR_n$ was a ⅛ |
| MSO2_R35 | Number of packets received with insufficient frame quality given that $RR_n$ was a ⅛ |
| MSO2_R36 | Number of Rate ⅛ packets received with detected test sequence errors given that $RR_n$ was a ⅛ |
| MSO2_R37 | Number of correct rate "m" packets given that $RR_n$ was "m", therefore: (MSO2_R37 = MSO2_R1 + MSO2_R13 + MSO2_R23 + MSO2_R33) |
| MSO2_R38 | Number of Rate 1 packets received in error, therefore: (MSO2_R38 = MSO2_R4 + MSO2_R5 + MSO2_R6 + MSO2_R7 + MSO2_R8) |
| MSO2_R39 | Number of bad frames overall, therefore: (MSO2_R39 = MSO2_R14 + MSO2_R15 + MSO2_R16 + MSO2_R17 + MSO2_R18 + MSO2_R19 + MSO2_R22 + MSO2_R24 + MSO2_R25 + MSO2_R26 + MSO2_R28 + MSO2_R31 + MSO2_R32 + MSO2_R34 + MSO2_R35 + MSO2_R38) |

IX. Computation of Frame Error Rate

The frame transmission and error statistics compiled within TABLES V and VI may be utilized in computation of a set of frame error rates associated with transmission at various frame rates. An exemplary set of frame error rates (FERs) for full-rate, ½ Rate, ¼ Rate, and ⅛ Rate transmissions on the reverse link between the mobile and cell-site stations may be determined in accordance with the following expressions:

$$FER_{Full-Rate} = 1 - MSO2\_R1_c / MSO2\_T1_m,$$

$$FER_{\frac{1}{2} Rate} = 1 - MSO2\_R13_c / MSO2\_T2_m,$$

$$FER_{\frac{1}{4} Rate} = 1 - MSO2\_R23_c / MSO2\_T3_m,$$

and $$FER_{\frac{1}{8} Rate} = 1 - MSO2\_R33_c / MSO2\_T4_m,$$

where counters incremented within the mobile station are identified by the subscript "m", and where counters incremented within the in the cell-site station are denoted by the subscript "c". It is noted that the exemplary set of frame error rate expressions set forth above are independent of the number of dim-and-burst frames and blank-and-burst frames transmitted over a particular test interval.

Similarly, the frame transmission and error statistics compiled within TABLES V and VI may be utilized in computation of a set of frame error rates associated with transmission over the forward link at various frame rates. An exemplary set of frame error rates (FERs) for full-rate, ½ Rate, ¼ Rate, and ⅛ Rate transmissions on the forward link from the cell-site station to the mobile unit may be determined in accordance with the following expressions:

$$FER_{Full-Rate} = 1 - MSO2\_R1_m/MSO2\_T1_c,$$

$$FER_{\frac{1}{2} Rate} = 1 - MSO2\_R13_m/MSO2\_T2_c,$$

$$FER_{\frac{1}{4} Rate} = 1 - MSO2\_R23_m/MSO2\_T3_c,$$

and $$FER_{\frac{1}{8} Rate} = 1 - MSO2\_R33_m/MSO2\_T4_c,$$

where counters incremented within the mobile station are again identified by the subscript "m", and where counters incremented within the in the cell-site station are denoted by the subscript "c". This exemplary set of forward link frame error rate expressions are also independent of the number of transmitted dim-and-burst frames and blank-and-burst frames.

It is observed that the values of the cell-site station counters $MSO2\_T1_c$, $MSO2\_T2_c$, $MSO2\_T3_c$, and $MSO2\_T4_c$ may be estimated by summing the values of the corresponding mobile station counters. Similarly, the values of the mobile station counters $MSO2\_T1_m$, $MSO2\_T2_m$, $MSO2\_T3_m$, and $MSO2\_T4_m$ may be estimated by summing the values of the corresponding base station counters.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a communication system in which digital information is transmitted at variable rates over a communication channel, a method for measuring a performance of said communication channel comprising the steps of:

transmitting a test sequence of frames of digital data at one or more of a plurality of selectable rates over said communication channel wherein said rate of each of said frames is selected in accordance with a model of human speech;

receiving said test sequence of digital data transmitted over said communication channel;

generating a replica of said test sequence of digital data; and comparing said replica of said test sequence of digital data to said test sequence of data received over said communication channel so as to determine said performance of data transmission over said communication channel.

2. The method of claim 1 wherein said test sequence of digital data is generated in accordance with a pseudorandom process.

3. The method of claim 1 wherein said step of transmitting includes the steps of:

generating a first plurality of data packets comprising said test sequence of digital data;

assigning said rate to each of said data packets in accordance with said model of human speech; and transmitting each of said first plurality of data packets at the one of said multiplicity of data rates assigned thereto.

4. The method of claim 3 wherein said step of generating said replica of said test sequence of digital data includes the step of generating a second plurality of data packets substantially identical to said first sequence of data packets.

5. The method of claim 3 wherein said step of generating said first plurality of data packets includes the step of generating bit sequences within each of said first plurality of data packets in accordance with a second pseudorandom process.

6. In a digital communication system in which frames of digital data are transmitted at selected rates over a communication channel between a remote terminal and a base station, a method for measuring a performance of said communication channel comprising the steps of:

transmitting, from said remote terminal to said base station over said communication channel, a first of said frames of digital data wherein said selected rate of each of said frames is selected in accordance with a model of human speech, said first frame of digital data including a first packet of digital test data;

receiving, at said base station, said first frame of digital data;

generating, at said base station, a replica of said first packet of digital test data; and comparing said replica of said first packet of digital test data to said first packet of digital test inherent within said first frame of digital data received at said base station so as to determine said performance of data transmission over said communication channel.

7. The method of claim 6 further including the step of receiving each of said frames digital data at said base station determining a data rate associated with each of said received frames of digital information.

8. The method of claim 7 further including the step of generating said replica of said first packet of digital test data in accordance with the data rate associated with said first frame of digital information.

9. The method of claim 8 further including the step of generating a bit sequence within said first packet of digital test data in accordance with a pseudorandom process.

10. The method of claim 6 wherein said step of transmitting said first frame of digital data over said communication channel includes the step of modulating said first frame of digital data using a spread spectrum modulation signal.

11. The method of claim 6 wherein said step of transmitting said first frame of digital data over said communication channel includes the step of modulating said first frame of digital data using a pseudo-noise (PN) signal corresponding to a predetermined PN binary sequence.

12. The method of claim 6 further including the step of transmitting a plurality of frames of digital data over said communication channel wherein each one of said plurality of frames includes a packet of digital test data generated in accordance with a pseudorandom process.

13. The method of claim 6 wherein said step of comparing includes the step of comparing bit sequences comprising said replica of said first packet of digital test data to a corresponding bit sequence within said first packet of digital test data in order to accumulate a cumulative bit error count.

14. The method of claim 13 further including the steps of:
counting said frames of said digital information received at said base station so as to determine a received frame count; and
calculating frame error statistics based on said cumulative bit error count and said received frame count.

15. In a digital communication system in which frames of digital information are transmitted at selected rates over a communication channel from a base station to a remote terminal, a method for measuring a performance of said communication channel comprising the steps of:
transmitting, from said base station to said remote terminal, a packet of digital test data within each of said frames of digital information wherein the selected rate of said digital test data is selected in accordance with a model of human speech;
receiving, at said remote terminal, said frames of said digital information transmitted from said base station;
generating, at said remote terminal, replicas of each of said packets of digital test data within said frames of digital information received at said base station; and
comparing said replicas of said packets of digital test data to said received packets of digital test data so as to determine said performance of data transmission over said communication channel.

16. The method of claim 15 wherein said step of comparing includes the step of comparing bit sequences comprising said replicas of said packets of digital test data to corresponding ones of bit sequences comprising said received packets of digital test data in order to accumulate a cumulative bit error count.

17. The method of claim 16 further including the steps of:
counting said frames of said digital information received at said remote terminal so as to determine a received frame count; and
calculating frame error statistics based on said cumulative bit error count and said received frame count.

18. In a communication system in which digital information is transmitted at selected rates over a communication channel, a system for measuring a performance of said communication channel comprising:
a transmitter for transmitting a test sequence of digital data at one or more selectable rates over said communication channel wherein the rate of said test sequence is determined in accordance with a model of human speech;
a receiver for receiving said test sequence of digital data transmitted over said communication channel, said receiver including means for generating a replica of said test sequence of digital data; and
a digital comparator circuit for comparing said replica of said test sequence of digital data to said test sequence of data received over said communication channel so as to determine said performance of data transmission over said communication channel.

19. The system of claim 18 wherein said transmitter includes means for transmitting said test sequence of digital data at a first of said one or more of said selectable rates and said receiver includes means for identifying said first data rate.

20. The system of claim 18 further including means for selecting said test sequence of digital data from a set of pseudorandom data sequences.

21. The system of claim 18 wherein said transmitter further includes:
means for generating a first plurality of data packets comprising said test sequence of digital data;
means for assigning one of a multiplicity of data rates to each of said data packets in accordance with a first pseudorandom process; and
means for transmitting each of said first plurality of data packets at the one of said multiplicity of data rates assigned thereto.

22. The system of claim 21 wherein said means for generating said replica of said test sequence of digital data includes means for generating a second plurality of data packets substantially identical to said first sequence of data packets.

23. The system of claim 22 wherein said means for generating said first plurality of data packets includes means for generating bit sequences within each of said first plurality of data packets in accordance with a second pseudorandom process.

24. In a digital communication system in which frames of digital are transmitted at selected rates over a communication channel between a remote terminal and a base station, a system for measuring a performance of said communication channel comprising:
a transmitter, disposed in said remote terminal, for transmitting a packet of digital test data within each of said frames of digital information wherein the rate of said packet of digital test data is selected in accordance with a model of human speech;
a receiver, disposed at said remote terminal, for receiving said frames of said digital information transmitted from said base station;
means for generating replicas of each of said packets of digital test data within said frames of digital information received at said base station; and
means for comparing said replicas of said packets of digital test data to said received packets of digital test data so as to determine said performance of data transmission over said communication channel.

25. The system of claim 24 wherein said receiver includes means for determining a data rate associated with each of said frames of digital information.

26. The system of claim 25 further including means for generating each of said replicas of said packets of digital test data based on the data rate associated with one of said frames of digital information.

27. The system of claim 26 further including means for generating bit sequences within each of said packets of digital test data in accordance with a pseudorandom process.

28. The system of claim 24 wherein said comparator means includes means for comparing bit sequences comprising said replicas of said packets of digital test data to corresponding ones of bit sequences comprising said received packets of digital test data in order to accumulate a cumulative bit error count.

* * * * *